(12) United States Patent
Gallien et al.

(10) Patent No.: US 10,539,168 B2
(45) Date of Patent: Jan. 21, 2020

(54) ATTACHMENT BRACKET AND SUPPORT ASSEMBLY

(71) Applicant: BOMBARDIER INC., Dorval (CA)

(72) Inventors: Rene Gallien, Ile-Bizard (CA); Martin Deshaies, Saint-Lazare (CA)

(73) Assignee: BOMBARDIER INC., Dorval (CA)

( * ) Notice: Subject to any disclaimer, the term of this patent is extended or adjusted under 35 U.S.C. 154(b) by 0 days.

(21) Appl. No.: 15/750,928

(22) PCT Filed: Aug. 1, 2016

(86) PCT No.: PCT/IB2016/054622
§ 371 (c)(1),
(2) Date: Feb. 7, 2018

(87) PCT Pub. No.: WO2017/029569
PCT Pub. Date: Feb. 23, 2017

(65) Prior Publication Data
US 2018/0231041 A1    Aug. 16, 2018

Related U.S. Application Data

(60) Provisional application No. 62/206,477, filed on Aug. 18, 2015.

(51) Int. Cl.
*F16M 11/00* (2006.01)
*F16B 11/00* (2006.01)
(Continued)

(52) U.S. Cl.
CPC .......... *F16B 11/006* (2013.01); *F16B 37/044* (2013.01); *F16M 13/02* (2013.01);
(Continued)

(58) Field of Classification Search
CPC ............................... F16B 11/006; E04F 13/06
See application file for complete search history.

(56) References Cited

U.S. PATENT DOCUMENTS 5,813,179 A * 9/1998 Koenig, Jr. ............. E04F 13/06
403/267
6,142,779 A    11/2000 Siegel et al.
(Continued)

OTHER PUBLICATIONS

International Search Report and Written Opinion, issued in PCT application No. PCT/IB2016/054622, dated Nov. 15, 2016.

*Primary Examiner* — Amy J. Sterling
(74) *Attorney, Agent, or Firm* — Norton Rose Fulbright Canada LLP

(57) ABSTRACT

A support assembly (10) having a structural element (12) having first and second non-parallel adjoining surfaces (18), a bracket (14) attached to the structural element (12), and a component support (16). The bracket (14) has a first flange (20) including a first attachment surface (24) adhesively bonded to the first surface (18) of the structural element (12), a second flange (20) including a second attachment surface (24) adhesively bonded to the second surface (18) of the structural element (12), and a connection portion (48) interconnecting the first and second flanges (20), the connection portion (48) extending spaced from the structural element (12) such that a gap (52) is defined therebetween. The component support (16) is engaged to the first flange (20). The connection portion (48) may have a lower resistance to rupture than that of the first and second flanges (20). A method of removably securing a component to a structural element is also discussed.

19 Claims, 5 Drawing Sheets

(51) Int. Cl.
*H02G 3/32* (2006.01)
*F16B 37/04* (2006.01)
*F16M 13/02* (2006.01)
F16B 39/00 (2006.01)
F16L 3/22 (2006.01)

(52) U.S. Cl.
CPC ................ *H02G 3/32* (2013.01); *F16B 39/00* (2013.01); *F16L 3/22* (2013.01)

(56) References Cited

U.S. PATENT DOCUMENTS

| | | |
|---|---|---|
| 7,434,775 B2 | 10/2008 | Wilcox |
| 7,703,738 B2 | 4/2010 | Pickens et al. |
| 8,740,152 B1 | 6/2014 | Lyon et al. |
| 2005/0023421 A1 | 2/2005 | Wood et al. |
| 2005/0284995 A1 | 12/2005 | Hutter, III |
| 2007/0262219 A1 | 11/2007 | Hutter, III |
| 2008/0066403 A1* | 3/2008 | Koenig .................. E04F 13/06 52/255 |

\* cited by examiner

ATTACHMENT BRACKET AND SUPPORT ASSEMBLY

CROSS-REFERENCE TO RELATED APPLICATIONS

This application claims priority from U.S. provisional application No. 62/206,477 filed Aug. 18, 2015, the entire contents of which are incorporated by reference herein.

TECHNICAL FIELD

The application relates generally to the securing of components to structural elements, more particularly, to the securing of aircraft systems to aircraft structures.

BACKGROUND OF THE ART

Some installations require the removable engagement of various components and systems to a structure. Example of such installations include aircraft, in which systems used for testing before the aircraft comes into service typically need to be attached to the aircraft structure in a removable manner. It is generally preferable to attach the components without modifying the structure, and accordingly bonded supports are preferably used over fasteners penetrating the structure. Known bonded supports include a pad adhesively bonded to a surface of the structure, and typically require the use of a disposable tool to ensure proper positioning of the pad upon engagement with the surface. The disposable tool may increase installation costs, and the pad may be susceptible to detachment during use if the forces acting on the supported component act on the pad along a peel direction. Moreover, the bond between the pad and structure surface may lack sufficient strength for supporting some components.

SUMMARY

In one aspect, there is provided a support assembly comprising: a structural element having first and second surfaces, the first and second surfaces being adjoining and non-parallel to one another; a bracket attached to the structural element, the bracket comprising: a first flange including a first attachment surface adhesively bonded to the first surface of the structural element, a second flange including a second attachment surface adhesively bonded to the second surface of the structural element, and a connection portion interconnecting the first and second flanges, the connection portion extending spaced from the structural element such that a gap is defined therebetween; and a component support engaged to the first flange.

In a particular embodiment, the connection portion detachably interconnects the first and second flanges.

In a particular embodiment, the connection portion has a lower resistance to rupture than that of the first and second flanges such that a force required to rupture the connection portion and separate the first and second flanges is lower than a force required to rupture one of the first and second flanges. The connection portion may include a line of perforations defined therethrough, the connection portion being breakable along the line of perforations.

In a particular embodiment, the connection portion biases the first flange toward the first surface of the structural element and the second flange toward the second surface of the structural element.

In a particular embodiment, the connection portion has an arcuate cross-section with a concave side of the cross-section facing the structural element.

In a particular embodiment, the bracket is symmetrical about a plane extending through the connection portion.

In a particular embodiment, the component support is removably engaged to the first flange, and removably engageable to the second flange.

In a particular embodiment, the first flange has an attachment portion including the first attachment surface and a retaining portion extending from the attachment portion opposite the first attachment surface, the retaining portion having a cavity defined therein with outer walls of the retaining portion having first and second openings defined therethrough in communication with the cavity. The component support may include first and second complementary connection members removably connected to one another. The first connection member may be removably received in the cavity and be removable from the cavity through the first opening. The second opening may be sized such as to prevent the first connection member from passing therethrough. The second connection member may be connected to the first connection member through the second opening. The first connection member may be a nut and the second connection member may be a male fastener received through the second opening and threadingly engaged to the nut.

In a particular embodiment, the structural element is part of a structure of an aircraft and the component support is configured to engage an aircraft system.

In a particular embodiment, the first flange includes two spaced apart ridges extending from the first attachment surface in contact with the first surface of the structural element, the first attachment surface being adhesively bonded to the first surface of the structural element by an adhesive received between the two spaced apart ridges.

In another aspect, there is provided an attachment bracket for removably securing a component to a structural element, the attachment bracket comprising: a first flange having a first attachment portion and a first retaining portion extending from the first attachment portion, the first retaining portion configured to engage at least part of a component support; a second flange having a second attachment portion extending non-parallel to the first attachment portion; and a connection portion interconnecting the first and second flanges, wherein the connection portion has a lower resistance to rupture than that of the first and second flanges such that a force required to rupture the connection portion and separate the first and second flanges is lower than a force required to rupture one of the first and second flanges.

In a particular embodiment, the bracket is symmetrical about a plane extending through the connection portion.

In a particular embodiment, the second flange includes a second retaining portion extending from the second attachment portion, the first and second retaining portions each configured to removably engage the at least part of the component support.

In a particular embodiment, the connection portion includes a line of perforations defined therethrough, the connection portion being breakable along the line of perforations.

In a particular embodiment, the first attachment portion includes a first planar attachment surface and the second attachment portion includes a second planar attachment surface, the first and second planar attachment surfaces being non-parallel, each of the first and second planar attachment surfaces includes two spaced apart ridges extending therefrom.

In a particular embodiment, the connection portion has an arcuate cross-section.

In another aspect, there is provided an assembly comprising the attachment bracket as defined above and the at least part of the component support, wherein the first retaining portion has a cavity defined therein with outer walls of the first retaining portion having first and second openings defined therethrough in communication with the cavity, the at least part of the component support including a fastener removably received in the cavity and being removable from the cavity through the first opening, the second opening being sized such as to prevent the fastener from passing therethrough.

In a particular embodiment, the fastener is a nut, the at least part of the component support further comprising a second fastener received through the second opening and threadingly engaged to the nut.

In a further aspect, there is provided a method of removably securing a component to a structural element, the method comprising: adhesively bonding a first flange of a bracket to a first surface of the structural element; adhesively bonding a second flange of a bracket to a second surface of the structural element, the second surface adjoining the first surface and extending non-parallel thereto; and engaging the component to a component support connected to the first flange.

DESCRIPTION OF THE DRAWINGS

Reference is now made to the accompanying figures in which.

DETAILED DESCRIPTION

Figure 1:
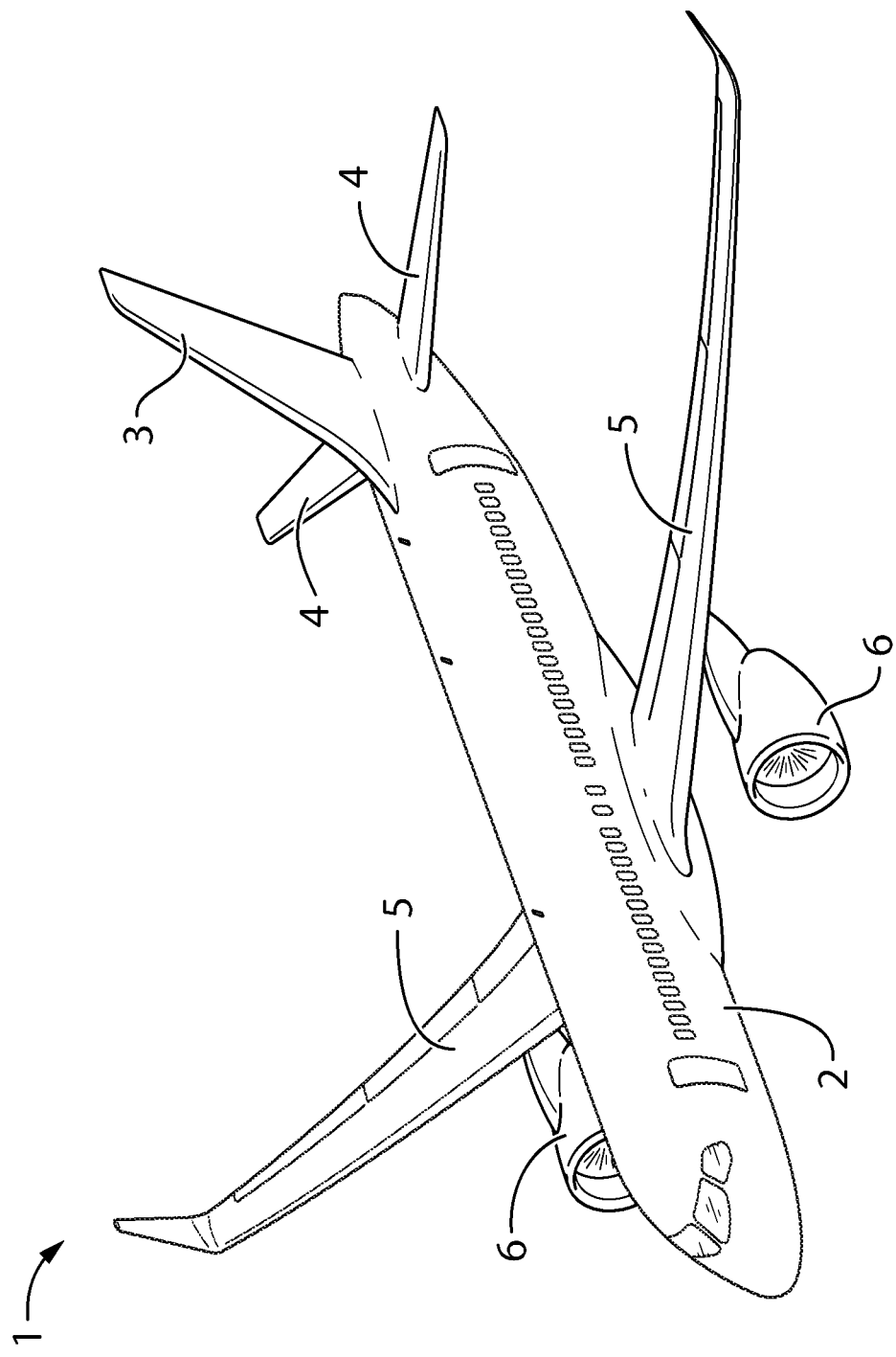
FIG. 1 is a schematic tridimensional view of an aircraft according to a particular embodiment.

Referring to the drawings and more particularly to FIG. 1, an aircraft is shown at 1, and is generally described to illustrate some components for reference purposes in the present disclosure. The aircraft 1 has a fuselage 2 having a fore end at which a cockpit is located, and an aft end supporting a tail assembly, with the cabin generally located between the cockpit and the tail assembly. The tail assembly comprises a vertical stabilizer 3 with a rudder, and horizontal stabilizers 4 with elevators. The tail assembly has a fuselage-mounted tail, but other configurations may also be used for the aircraft 1, such as cruciform, T-tail, etc. Wings 5 project laterally from the fuselage. The aircraft 1 has engines 6 supported by the wings 5, although the engines 6 could also be mounted to the fuselage 2. The aircraft 1 is shown as a jet-engine aircraft, but may also be a propeller aircraft.

Figure 2:
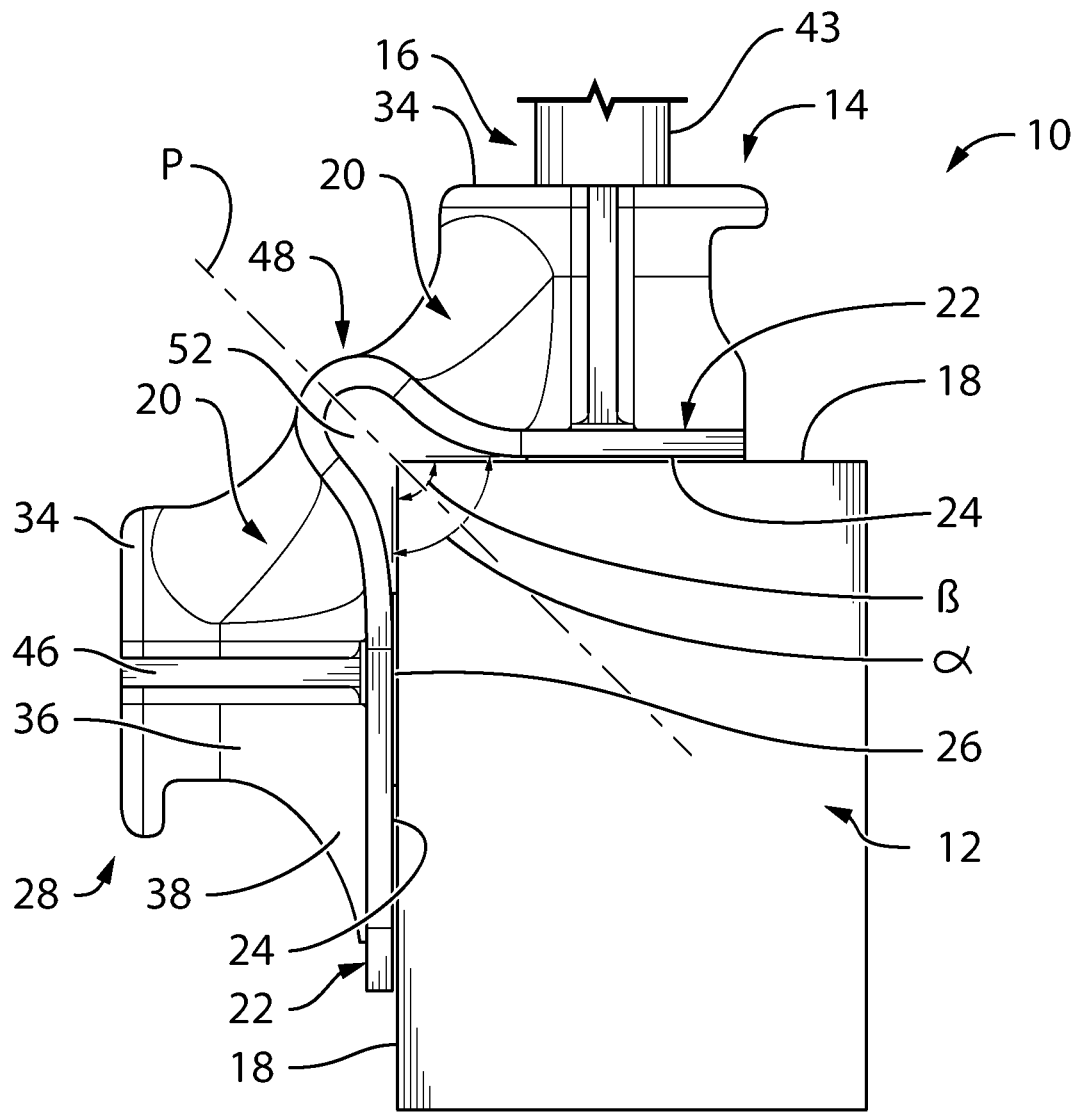
FIG. 2 is a schematic side view of a support assembly in accordance to a particular embodiment, which may be used in an aircraft such as shown in FIG. 1.

Referring to FIG. 2, a support assembly 10 according to a particular embodiment is shown. The support assembly 10 generally includes a structural element 12, an attachment bracket 14, and a component support 16. In a particular embodiment, the structural element 12 is any structural element forming part of the fuselage 2 (whether part of its outer wall or of its internal structure, e.g. floor, bulkhead, etc.), or any structural element forming part of the wings 5. Examples of such structural elements include, but are not limited to, stringers, ribs, spars, frames, bulkhead panels and secondary structures.

For example, in a particular embodiment, the bracket 14 is used to attach test systems used in testing of the aircraft 1 prior to being put into service, i.e. systems that are removed from the aircraft 1 prior to the aircraft 1 being put into service, including experimental equipment and support structures adapted to receive such equipment. In another embodiment, the bracket 14 is used to attach systems used during service of the aircraft 1, including, but not limited to, electrical wiring and/or harnesses, air ducts, environmental control system components, sensors, and/or electronic units/boxes.

As can be seen in FIG. 2, the structural element 12 has two non-parallel adjoining surfaces 18. Although the structural element 12 is shown as having a rectangular cross-section, it is understood that the shape of the structural element 12 may vary and have, for example, a L-shaped cross-section, C-shaped cross-section, Z-shaped cross-section, I-shaped cross-section, a-shaped cross-section, etc.

The bracket 14 includes two flanges 20 interconnected by a connection portion 48. The flanges 20 each include an attachment portion 22 defining a respective attachment surface 24. The attachment surface 24 of each flange 20 is adhesively bonded to a respective one of the surface 18 of the structural element 12. The two attachment surfaces 24 are thus non-parallel to one another, and each have a shape complementary to that of the respective structural element surface 18. In the embodiment shown, the structural element surfaces 18 and the bracket attachment surfaces 24 are planar. It is however understood that the bracket attachment surfaces 24 could be configured to be received on curved structural element surfaces 18 and accordingly could be correspondingly curved.

The attachment surfaces 24 of the bracket 14 extend at an angle α from one another, as measured in a direction extending through the structural element 12. In the embodiment shown, the two attachment surfaces 24 extend at an angle α of 90° or about 90° with respect to one another, and the bracket 14 is configured as an "outer corner" bracket, with the attachment surfaces 24 facing each other. In a particular embodiment, the angle α is at least 30° and/or at most 120°. It is understood that the two attachment surfaces 24 may extend at any other appropriate angle α from one another, including an angle α greater than 180° such that the bracket 14 is configured as an "inner corner" bracket, with the attachment surfaces 24 facing away from each other.

Figure 4:
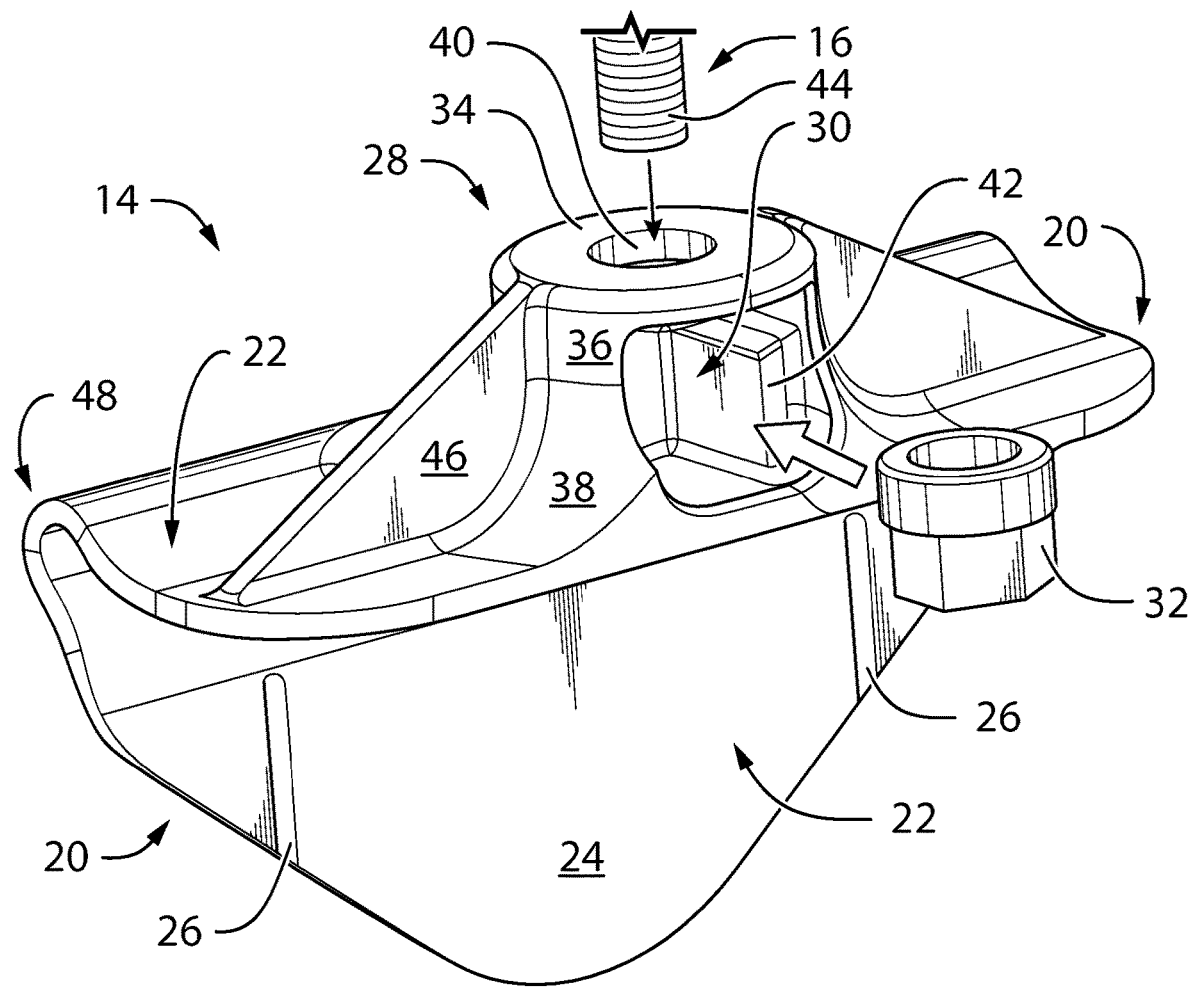
FIG. 4 is a schematic tridimensional view of the support assembly of FIG. 2.

As can be seen more clearly in FIGS. 2 and 4, each flange 20 includes at least two spaced apart ridges 26 extending from the attachment surface 24 to contact the surface 18 of the structural element 12. In the embodiment shown, the ridges 26 extend parallel to one another, along a direction generally intersecting the plane defined by the attachment surface 24 of the other flange 20; other configurations are also possible. The attachment surface 24 is adhesively bonded to the surface 18 of the structural element 12 by an adhesive received between the spaced apart ridges 26. The protuberance of the ridges 26 from the attachment surface 24 thus defines a spacing between the attachment surface 24 of the bracket 14 and the surface 18 of the structural element 12, and accordingly the thickness of adhesive that can be received therebetween. In a particular embodiment, the presence of the ridges 26 helps improve repeatability in the application of adhesive between similar brackets 14. The ridges 26 may be provided in one or preferably both of the attachment surfaces 24; alternately, the ridges 26 may be omitted.

Each flange 20 also includes a retaining portion 28 extending from the attachment portion 22 opposite the attachment surface 24. The retaining portion 28 is configured to engage at least part of the component support 16. In the embodiment shown, the retaining portion 28 has a cavity 30 (see FIG. 4) defined therein, shaped to receive an element 32 of the component support which in this particular embodiment is a nut. The retaining portion 28 provides anti-rotation features within the cavity 30 such that the nut 32 (or other element of the support received therein) is prevented from rotating inside the cavity 30, for example through the internal shape of the cavity 30 and the interaction of its walls with the outer surface of the nut 32. In the embodiment shown, the retaining portion 28 has outer walls including a circular top wall 34, and a cylindrical side wall 36 extending from the top wall 34 and connected to the attachment portion 22 by a filet connection 38.

Figure 3:
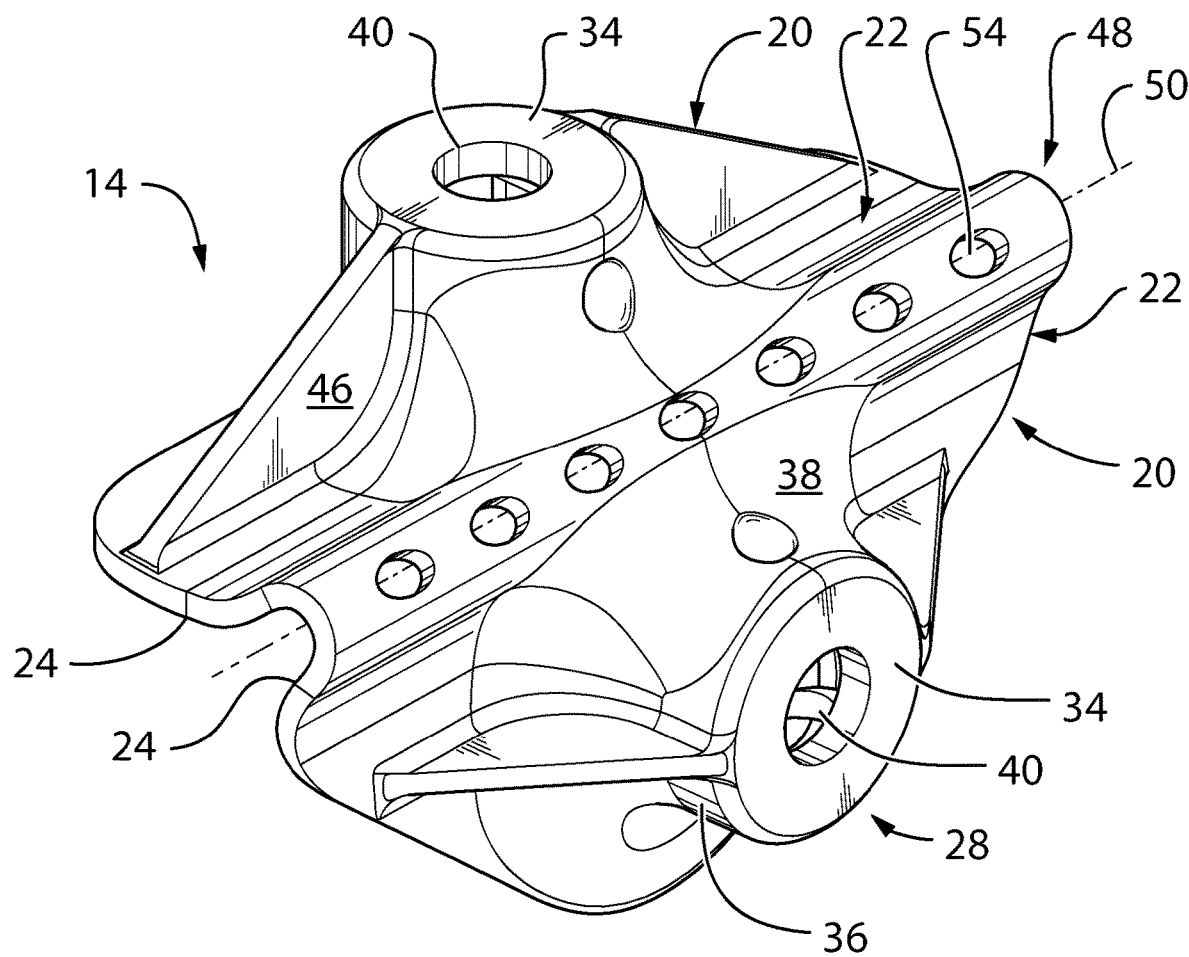
FIG. 3 is a schematic tridimensional view of a bracket of the support assembly of FIG. 2.

As can be seen in FIGS. 3-4, the outer walls 34, 36 of the retaining portion 28 have two openings 40, 42 defined therethrough in communication with the cavity 30. In the embodiment shown, one of these openings 40 is defined through the top wall 34, and the other opening 42 is defined through the side wall 36 (see FIG. 4). The nut 32 is removable from the cavity 30 through the opening 42 defined in the side wall 36, but the opening 40 defined in the top wall 34 is sized such as to prevent the nut 32 from passing therethrough. A male fastener 44 (e.g. screw, bolt) also forming part of the support 16 is receivable through the opening 40 defined in the top wall 34 to threadingly engage the nut 32 received in the cavity 30. The engagement with the male fastener 44 retains the nut 32 in the cavity 30. As can be seen in FIG. 2, in a particular embodiment the support 16 includes an enlarged portion 43 above the male fastener 44 which is larger than the opening 40 and abuts the surface of the top wall 34 when the fastener 44 is received in the cavity 30 and engaged with the nut 32.

In the embodiment shown, each flange 20 includes two reinforcement webs 46 extending on opposite sides of the retaining portion 28, having a lateral edge connected to the retaining portion 28 and a bottom edge connected to the attachment portion 22, with the webs 46 extending parallel to a longitudinal axis 50 of the connection portion 48. It is understood that the configuration of the retaining portion 28 and/or flange 20 may vary.

Although the retaining portion 28 is shown as receiving a nut in the cavity 30, it is understood that the cavity 30 may be configured to receive any other type of connection member or other element of the support 16, with a complementary connection member or other element of the support 16 being engaged (whether by threaded engagement or any other appropriate type of detachable engagement) to the connection member/element received in the cavity 30 through the smaller opening of the retaining portion 28. Moreover, the retaining portion 28 may alternately permanently engage the component support 16, either as a whole (e.g. one piece component support) or by engaging a part thereof. In use, a component can thus be secured to the structural element 12 by adhering each flange 20 of the bracket 14 to the respective surface 18 of the structural element 12, and engaging the component to the component support 16 connected to the one of the flanges 20.

Although the bracket 14 has been shown as being symmetrical about a plane P extending through the connection portion 48 (see FIG. 2), it is understood that the bracket 14 may alternately be non-symmetrical. For example, only one of the flanges 20 may include the retaining portion 28, or the retaining portions 28 of the two flanges 20 may be configured differently from one another.

As can be seen in FIG. 2, the connection portion 48 of the bracket 14 extends spaced from the structural element 12 such that a gap 52 is defined therebetween. In a particular embodiment, the angle $\alpha$ between the attachment surfaces 24 is slightly smaller than an angle $\beta$ between the surfaces 18 of the structural element 12, as measured through the structural element 12. Engagement of the attachment surfaces 24 of the bracket 14 with the surfaces 18 of the structural element 12 thus produces an elastic deformation in the connection portion 48, which then biases each of the flanges 20 towards the surface 18 of the structural element 12 it is engaged with. In a particular embodiment, the angle $\alpha$ between the attachment surfaces 24 is 0.5° or approximately 0.5° smaller than the angle $\beta$ between the surfaces 18 of the structural element 12; other values are also possible. Alternately, the bias of the connection portion 48 may be omitted, and the angle $\alpha$ between the attachment surfaces 24 corresponds to the angle $\beta$ between the surfaces 18 of the structural element 12.

In a particular embodiment, the gap 52 between the connection portion 48 and the structural element 12 is shaped and sized such as to allow the insertion of a tool therethrough, which may be used to break the connection portion 48 when the bracket 14 needs to be detached from the structural element 12. In the embodiment shown, the connection portion 48 has an arcuate cross-section with a concave side of the cross-section facing the structural element 12. Other configurations are also possible.

In a particular embodiment, the connection portion 48 has a lower resistance to rupture than that of the flanges 20, such that the force that is required to rupture the connection portion 48 in order to separate the flanges 20 is lower than the force that would be required to rupture any one of the flanges 20. In the embodiment shown and as can be more clearly seen in FIG. 3, this is achieved by the connection portion 48 including a line of perforations 54 defined therethrough, such that the connection portion 48 is breakable along the line of perforations 54. In the embodiment shown, the perforations 54 are equally spaced apart along the longitudinal axis 50 of the connection portion 48. Other configurations are possible.

Alternately, the connection portion 48 may be formed with a lower resistance to rupture than that of the flanges 20 without the use of perforations 54. For example, the lower resistance to rupture could be created by having a smaller thickness in the connection portion 40 than in the attachment portions 22 of the flanges 20. The connection portion 48 could also be made of two parts, each connected to one of the flanges 20, and detachably interconnected through one or more removable fastening elements; for example, the two parts could be configured as a piano hinge, and retained together through a removable pin slidingly received within aligned openings of the two parts and removable therefrom. Other configurations are also possible.

In a particular embodiment, only one of the flanges 20 engages a component support 16. The bracket 14 thus allows for selective positioning of the component support 16 in two alternate positions by the same bracket 14, as defined by the two retaining portions 28. Alternately, the two flanges 20 may each engage a respective component support 16, such that the bracket 14 is able to support systems along two surfaces of the structural element 12.

Figure 5:
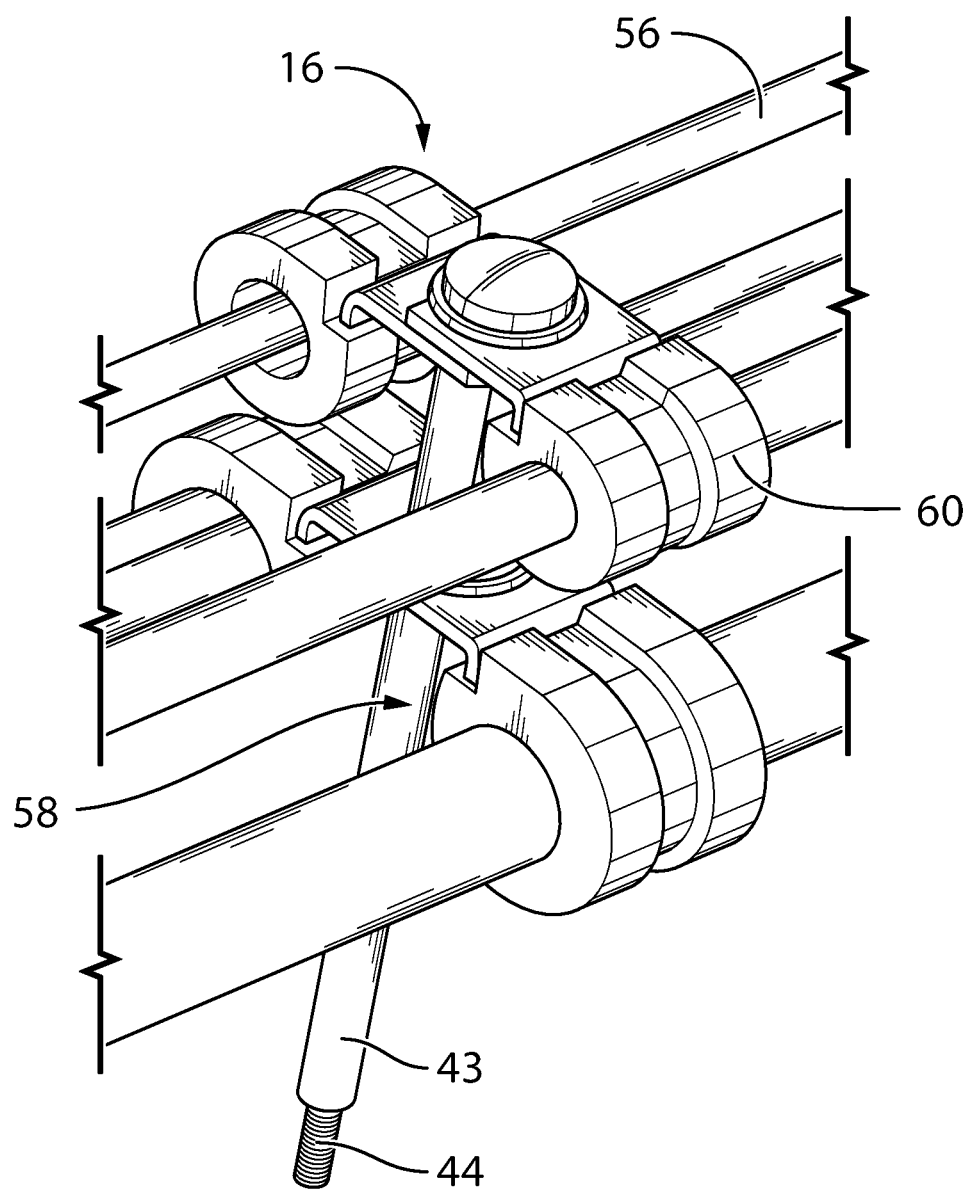
FIG. 5 is a schematic tridimensional view of a component support in accordance to a particular embodiment, which may be used in the support assembly of FIG. 2.

FIG. 5 shows an example of a component support 16, which is configured to support a plurality of electrical wires 56. The support 16 includes a post 58, to which are engaged a plurality of support loops each sized to surround a respective wire 56. A bottom of the post 58 is defined as or includes the male fastener 44 complementary to the nut received in the cavity 30 of the retaining portion 28 of the bracket 14 and receivable through the top wall opening 40. Although not shown, the enlarged portion 43 may be larger than the remainder of the post 58. It is understood that the configuration of the component support 16 will vary according to the component being supported, and that each support 16 may be designed to support a single component, or any number of components, within acceptable weight and stress limits for the bracket 14 and its attachment to the structural element 12.

The attachment bracket 14 advantageously allows for the attachment of components to the structural element 12 in a removable fashion that does not affect the integrity of the structural element 12 (e.g. without the need to create attachment holes through the structural element 12 to engage the bracket 14). Although the support assembly 10 has been described as part of the aircraft 1, it is understood that the attachment bracket 14 may alternately be used in any environment where a component needs to be engaged to a structural element, including, but not limited to, a structural component of any other type of vehicle (aerospace, naval, ground transportation, etc.), and any appropriate type of support structure having adjoining surfaces.

In a particular embodiment, the bonding of the bracket 14 on two non-parallel surfaces 18 allows for an improved connection of the bracket 14 to the structural element 12, as compared to brackets bonded on a single surface. The two non-parallel bonding planes defined by the two attachment surfaces 24 ensure that at least one of the bonding planes will be oriented such as to be loaded in a direction other than the peel direction, and preferably loaded in shear. This may allow for an increased reliability of the connection between the bracket 14 and the structural element 12, and/or allow for greater loads to be supported by the bracket 14.

In a particular embodiment, the bonding of the bracket 14 on the two adjoining surfaces 18 may help positioning of the bracket 14 without the need for additional tools, and accordingly may help improve repeatability and/or reduce time and costs of the installation process, as compared to brackets bonded on a single surface.

The presence of two retaining portions 28 on a same bracket 14 may help reduce the number of parts required to support a given number of components.

In a particular embodiment, the broken connection portion 48 provides for a lever point which can be used to detach the bracket flanges 20 from the structural element 12, and accordingly may provide for easier removal of the bracket 14 from the structural element 12 and/or reduce a risk of causing damage to the structural element 12 upon removal.

In embodiments where the retaining portion 28 removably engages the component support 16 in part or as a whole, such as with the removable nut 32, the entire component support 16, including the fasteners engaging the component support 16 to the bracket 14, can be replaced if required without requiring the bracket 14 to be detached from the structural element 12. By contrast, some prior art brackets have an integral fastener to engage the support, which requires the bracket to be detached from the structural element and be replaced in its entirety upon damage of such fastener.

Although not shown, the bracket 14 may include a third flange similar to the two flanges 20 shown, and connected to each of the two flanges 20 by a respective additional connection portion. The third flange defines a third attachment surface which is oriented with respect to the other two attachment surfaces 24 such as to engage a third adjoining surface of the structural element 12, for example at a tridimensional corner of the structural element 12. Each of the connection portions may have a resistance to rupture lower than that of the flanges, for example due to perforations defined therethrough.

It is understood that any combination or sub-combination of the elements of the different embodiments is within the scope of this disclosure. While the methods and systems described herein have been described and shown with reference to particular steps performed in a particular order, it will be understood that these steps may be combined, sub-divided or reordered to form an equivalent method without departing from the teachings of the present invention. Accordingly, the order and grouping of the steps is not a limitation of the present invention.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

The invention claimed is:

1. A support assembly comprising:
   a structural element having first and second surfaces, the first and second surfaces being adjoining and non-parallel to one another;
   a bracket attached to the structural element, the bracket comprising:
   a first flange including a first attachment surface adhesively bonded to the first surface of the structural element,
   a second flange including a second attachment surface adhesively bonded to the second surface of the structural element, and
   a connection portion interconnecting the first and second flanges, the connection portion extending spaced from the structural element such that a gap is defined therebetween, the connection portion detachably interconnecting the first and second flanges; and
   a component support engaged to the first flange, wherein the component support is removably engaged to the first flange, and removably engageable to the second flange.

2. The support assembly as defined in claim 1, wherein the connection portion has a lower resistance to rupture than that of the first and second flanges such that a force required to rupture the connection portion and separate the first and second flanges is lower than a force required to rupture one of the first and second flanges.

3. The support assembly as defined in claim 2, wherein the connection portion includes a line of perforations defined therethrough, the connection portion being breakable along the line of perforations.

4. The support assembly as defined in claim 1, wherein the connection portion biases the first flange toward the first surface of the structural element and the second flange toward the second surface of the structural element.

5. The support assembly as defined in claim 1, wherein the connection portion has an arcuate cross-section with a concave side of the cross-section facing the structural element.

6. The support assembly as defined in claim 1, wherein the bracket is symmetrical about a plane extending through the connection portion.

7. The support assembly as defined in claim 1, wherein the first flange has an attachment portion including the first attachment surface and a retaining portion extending from the attachment portion opposite the first attachment surface, the retaining portion having a cavity defined therein with outer walls of the retaining portion having first and second openings defined therethrough in communication with the cavity.

8. The support assembly as defined in claim 7, wherein, the component support includes first and second complementary connection members removably connected to one another, the first connection member removably received in the cavity and being removable from the cavity through the first opening, the second opening being sized such as to prevent the first connection member from passing therethrough, the second connection member connected to the first connection member through the second opening.

9. The support assembly as defined in claim 8, wherein the first connection member is a nut and the second connection member is a male fastener received through the second opening and threadingly engaged to the nut.

10. The support assembly as defined in claim 1, wherein the structural element is part of a structure of an aircraft and the component support is configured to engage an aircraft system.

11. The support assembly as defined in claim 1, wherein:
the first flange includes two spaced apart ridges extending from the first attachment surface in contact with the first surface of the structural element, the first attachment surface being adhesively bonded to the first surface of the structural element by an adhesive received between the two spaced apart ridges.

12. An attachment bracket for removably securing a component to a structural element, the attachment bracket comprising:
a first flange having a first attachment portion and a first retaining portion extending from the first attachment portion, the first retaining portion configured to engage at least part of a component support;
a second flange having a second attachment portion extending non-parallel to the first attachment portion; and
a connection portion interconnecting the first and second flanges, wherein the connection portion has a lower resistance to rupture than that of the first and second flanges such that a force required to rupture the connection portion and separate the first and second flanges is lower than a force required to rupture one of the first and second flanges,
wherein the first flange is removably engageable to the component support and the second flange is removably engageable to the component support.

13. The attachment bracket as defined in claim 12, wherein the bracket is symmetrical about a plane extending through the connection portion.

14. The attachment bracket as defined in claim 12, wherein the second flange includes a second retaining portion extending from the second attachment portion, the first and second retaining portions each configured to removably engage the at least part of the component support.

15. The attachment bracket as defined in claim 12, wherein the connection portion includes a line of perforations defined therethrough, the connection portion being breakable along the line of perforations.

16. The attachment bracket as defined in claim 12, wherein the first attachment portion includes a first planar attachment surface and the second attachment portion includes a second planar attachment surface, the first and second planar attachment surfaces being non-parallel, each of the first and second planar attachment surfaces includes two spaced apart ridges extending therefrom.

17. The attachment bracket as defined in claim 12, wherein the connection portion has an arcuate cross-section.

18. An assembly comprising the attachment bracket as defined in claim 12 and the at least part of the component support, wherein the first retaining portion has a cavity defined therein with outer walls of the first retaining portion having first and second openings defined therethrough in communication with the cavity, the at least part of the component support including a fastener removably received in the cavity and being removable from the cavity through the first opening, the second opening being sized such as to prevent the fastener from passing therethrough.

19. The assembly as defined in claim 18, wherein the fastener is a nut, the at least part of the component support further comprising a second fastener received through the second opening and threadingly engaged to the nut.

* * * * *